(12) United States Patent
Okezie

(10) Patent No.: US 6,437,690 B1
(45) Date of Patent: Aug. 20, 2002

(54) UNINSURED AND/OR STOLEN VEHICLE TRACKING SYSTEM

(76) Inventor: Pathfins C. Okezie, 351 Crowells Rd., Apt. A, Highland Park, NJ (US) 08904

( * ) Notice: Subject to any disclaimer, the term of this patent is extended or adjusted under 35 U.S.C. 154(b) by 0 days.

(21) Appl. No.: 09/671,522

(22) Filed: Sep. 27, 2000

(51) Int. Cl.[7] .............................................. G08B 26/00
(52) U.S. Cl. ..................................................... 340/505
(58) Field of Search ................................ 340/902, 905, 340/539, 933, 904, 932.2

(56) References Cited

U.S. PATENT DOCUMENTS

| | | | | |
|---|---|---|---|---|
| 5,526,357 A | * | 6/1996 | Jandrell | 340/988 |
| 5,534,856 A | * | 7/1996 | Cadman | 340/825.34 |
| 5,550,551 A | * | 8/1996 | Alesio | 342/457 |
| 5,552,933 A | * | 9/1996 | Buchwicz et al. | |
| 5,568,512 A | * | 10/1996 | Rotzoll | 375/211 |
| 5,602,919 A | * | 2/1997 | Hurta et al. | 340/928 |
| 5,805,082 A | * | 9/1998 | Hassett | 340/928 |
| 5,847,661 A | * | 12/1998 | Ricci | 340/905 |
| 6,052,068 A | * | 4/2000 | Price et al. | 340/933 |

* cited by examiner

Primary Examiner—Daryl Pope
(74) Attorney, Agent, or Firm—Walter J. Tencza, Jr.

(57) ABSTRACT

An apparatus comprising a first identification device, which is attached to a suspect vehicle and a suspect vehicle detection device which is attached to a police vehicle is disclosed. The first identification device contains a first set of data concerning the insurance coverage for the suspect vehicle. The suspect vehicle detection device obtains the first set of data from the first identification device. The first identification device may be comprised memory in which the first set of data is stored. The first identification device may be attached to a front windshield of the suspect vehicle and a similar second identification device may be attached to a rear windshield of the suspect vehicle. The first set of data may be comprised of an insurance underwriter code corresponding to the insurance underwriter which covers the suspect vehicle, an issue date and an expiration date of an insurance policy covering the suspect vehicle, an insurance policy number of the insurance policy which covers the suspect vehicle, a motor vehicle manufacturer identfication number of the suspect vehicle, the name of the owner of the suspect vehicle, and the suspect vehicle license plate number. The police vehicle may send the first set of data to a verification center along with a request for verification of the first set of data. The verification center may provide a verification signal to the police vehicle in response, and the verification signal may indicate whether the first set of data is valid. The verification center may include a table of information relating to the insurance coverage of a plurality of vehicles. Alternatively or additionally the police vehicle may include a table of data relating to insurance coverage of a plurality of vehicles and a processor. The processor of the police vehicle may compare the first set of data with the table of data in the police vehicle, and may cause an indication to be produced indicating whether the first set of data is contained in the table of data in the police vehicle. The police vehicle may includes a display device for displaing the indication.

1 Claim, 9 Drawing Sheets

Police Motor Vehicle

Fig. 7

| Underwriter Code | Policy Number | Name of Underwriter Insurance Company |
|---|---|---|
| Issue Date | Vehicle Manufacture Serial Code | Brand of Vehicle and Year |
| Expiration Date | Vehicle License Plate Number | Blank |
| Policy Number | Insurance vehicle Owner name | Blank |

Fig. 8

| Code | Name of Insurance Co. | License Plate # | Vehicle mfg. serial # | Policy Number | Issue Date | Expiration Date | Brand Name |
|---|---|---|---|---|---|---|---|
| 174 | ABC | Re1504 | F5264891 1428 | F058996 - 0 | 04/00 | 04/01 | Mazda |
| PTO | XYZ | ATFool | 222Fyo TP184 | Y2K45 221 | 08/00 | 08/01 | Toyota |
| 40B | Liberty | Boy George | Fog774 21214 | Bz551FT | 05/00 | 05/01 | Benz |
| B77 | Metlife | AP447 | ABT62 J5906 | Focbtz 55 | 8/99 | 8/01 | Volz Wagen |
| 202 | Capitm | YPX21 | Cat4796 21YOPI | AmAFB | 6/98 | 6/99 | Chev |
| 199 | Qyamd | APQ78 | ZY45P6 724y | 22746 p-2 | 4/94 | 4/95 | Olds |
| 200 | Isams | RC542V | JJ292 DT1551 | FQ1000 | 11/99 | 11/00 | Honda |

Fig. 9

| Code | Policy # | Vehicle Mfg. Serial No. | License Plate # | Issue Date | Expiration Date |
|---|---|---|---|---|---|
| 174 | F05899 | BOZ2444 26 | Re150 | 4/00 | 4/01 |
| ------- | G05000 | ABZ4926B | DV4221 | 8/99 | 9/99 |
| ------- | H05000 | ABJ9947-5 | FOV622 | 7/98 | 9/99 |
| ------- | I05000 | CAT-47862-B | PB887Z | 6/95 | 6/91 |
| ------- | J05000 | BOG97746-2 | ZEB452 | 7/80 | 7/81 |
| ------- | K05000 | FTZ7611221-P | APT881 | 2/87 | 2/87 |
| ------- | L05000 | B520Z778 | 05P291 | 7/94 | 7/95 |
| ------- | M05000 | ZE52J642 | J5114 | 12/01 | 12.02 |

Fig. 10

| Underwriter code | Policy # | Vehicle mfg. ID. | License Plate # | Policy Issue Date | Policy Expiration Date | Whether Revoked or Suspended |
|---|---|---|---|---|---|---|
| 174 | FO5895150 | 222FYT | Q7855 | 04/00 | 04/01 | Not |
| | | | | | | |

UNINSURED AND/OR STOLEN VEHICLE TRACKING SYSTEM

FIELD OF THE INVENTION

This invention relates to improved methods and apparatus for allowing the police to check various information relating to an automobile or its driver.

BACKGROUND OF THE INVENTION

When a police patrol officer pulls over a motorist in a suspect vehicle for a possible traffic violation the police officer may request that the motorist produce:(1) an operator's License; (2) registration papers for the suspect vehicle; and (3) the insurance card for the suspect vehicle.

With the operator's license/insurance card and/or vehicle registration papers, the officer may go back into his patrol car and inquire of the licensing office or police station whether the driver is actually and positively the licensed driver and also may verify the ownership of the vehicle in question. The police officer only does a visual observation of the insurance papers even if the driver/motorist presents to the police fake or forged insurance papers. The police officer will take in its face value that he has just seen and validate the insurance papers. There is no way for the police officer to verify the validity of the motorist/driver's insurance papers as he verified the operator license. Because there is no way to verify the validity of the insurance papers when pulled over by the police, some motorists/drivers drive with fake or forge auto insurance papers or carry no insurance at all. Some other times an uninsured driver drives his/her uninsured vehicle very carefully or cautiously so as to succeed in eluding law enforcement officers. Most of the time they succeed in eluding law enforcement officers by their innocent looking driving styles. As a result the "uninsured motorist" causes insurance rates to go up every year.

SUMMARY OF THE INVENTION

The present invention in one or more embodiments is designed to detect those motorists/drivers driving without auto insurance coverage. The present invention in one or more embodiments puts fear in those drivers who indulge in driving uninsured vehicles because the chances of being caught by law enforcement are higher now that they can be caught in their tracks. Hopefully this invention will help reduce uninsured motorists' insurance.

The present invention in one embodiment provides an apparatus comprising a first identification device, which is attached to a suspect vehicle and a suspect vehicle detection device which is attached to a police vehicle. The first identification device contains a first set of data concerning the insurance coverage for the suspect vehicle. The suspect vehicle detection device obtains the first set of data from the first identification device. The first identification device is comprised of electronic memory in which the first set of data is stored. The first identification device may be attached to a windshield of the suspect vehicle. The first set of data may be comprised of an insurance underwriter code corresponding to the insurance underwriter which covers the suspect vehicle, an issue date and a an expiration date of an insurance policy covering the suspect vehicle, an insurance policy number of the insurance policy which covers the suspect vehicle, a motor vehicle manufacturer identfication number of the suspect vehicle, the name of the owner of the suspect vehicle, and the suspect vehicle license plate number.

A second identification device can be provided which is similar to the first identification devie and which also may contain the first set of data. The first identification device may be attached to the front windshield of the suspect vehicle, while the second identification device may be attached to the rear windshield of the suspect vehicle.

The apparatus of an embodiment of the present invention may be further comprised of a verification center. The police vehicle may send the first set of data to the verification center along with a request for verification of the first set of data. The verification center may provide a verification signal to the police vehicle in response, and the verification signal may indicate whether the first set of data is valid. The verification center may include memory which includes a table of information relating to the insurance coverage of a plurality of vehicles.

Alternatively or additionally the police vehicle may include a table of data relating to insurance coverage of a plurality of vehicles and a processor. The processor of the police vehicle may compare the first set of data obtained from the suspect vehicle with the table of data in the police vehicle, and the processor may cause an indication to be produced indicating whether the first set of data is contained in the table of data in the police vehicle. The police vehicle may includes a display device and the indication produced may be a visual indication on the display device.

BRIEF DESCRIPTION OF THE DRAWINGS

FIG. 7 shows a table of information which is stored in the first and second identification cards shown in FIGS. 6A and 6B;

FIG. 8 shows a table of information which can be stored in a verification center;

FIG. 9 shows a table of information regarding a particular underwriter of insurance which can be stored in a police vehicle;

FIG. 10 shows a table of information regarding revokes licenses which can be stored in a police vehicle;

DETAILED DESCRIPTION OF THE DRAWINGS

Figure 1:
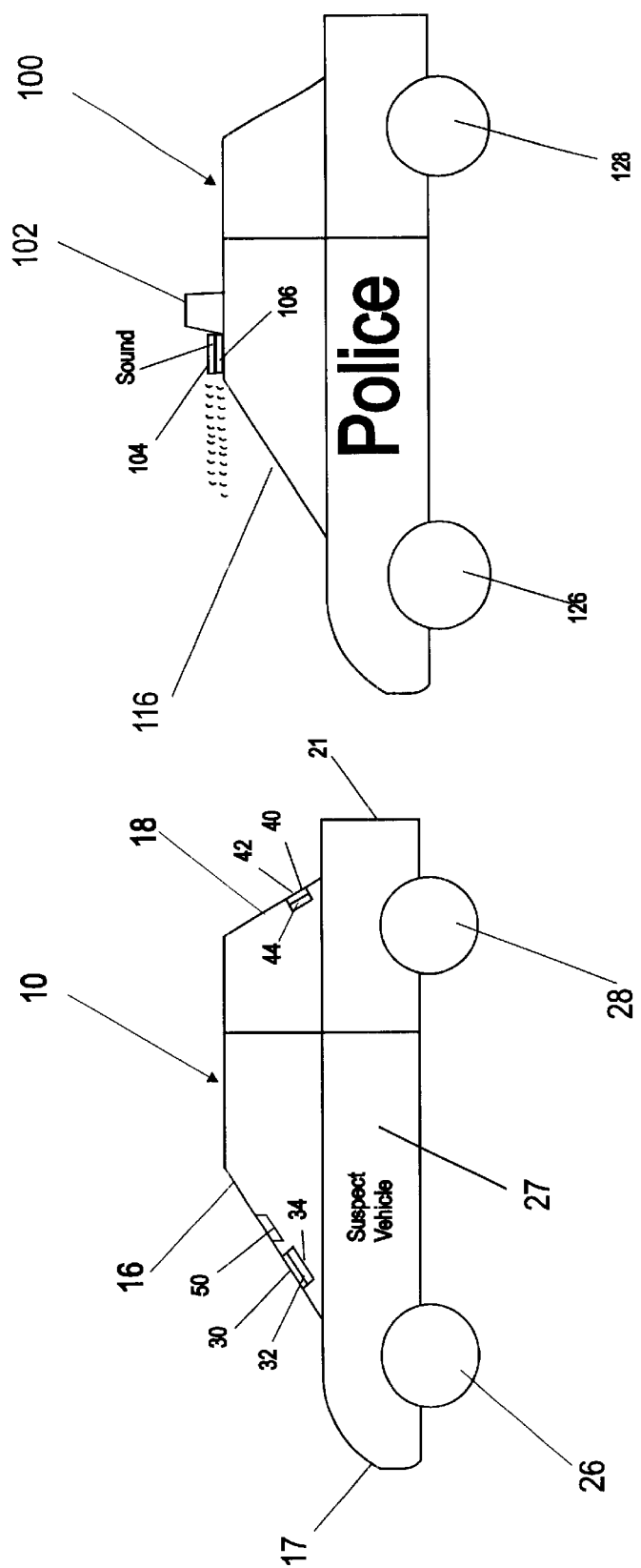
FIG. 1 shows a suspect vehicle and a police vehicle in accordance with an embodiment of the present invention.

FIG. 1 shows a suspect vehicle 10 and a police vehicle 100 in accordance with an embodiment of the present invention. The suspect vehicle 10 includes a front windshield 16, a rear windshield 18, and tires 26 and 28. The suspect vehicle 10 also includes a first identification device 30 which has an adhesive portion 32 and a housing portion 34. The adhesive portion 32 fixes the housing portion 34 to the front windshield 16. The suspect vehicle 10 also includes a second identification device 40 which has an adhesive portion 42 and a housing portion 44. The adhesive portion 42 fixes the housing portion 44 to the rear windshield 18.

The police vehicle 100 includes a flashing siren 102 and an audible siren 104. The police vehicle 100 also includes a housing 106 which includes components (shown in block diagram in FIG. 5) for detecting and analyzing various information from the first and/or second identification devices 30 and 40, respectively. The police vehicle also includes front windshield 116, and tires 126 and 128.

Figure 2:
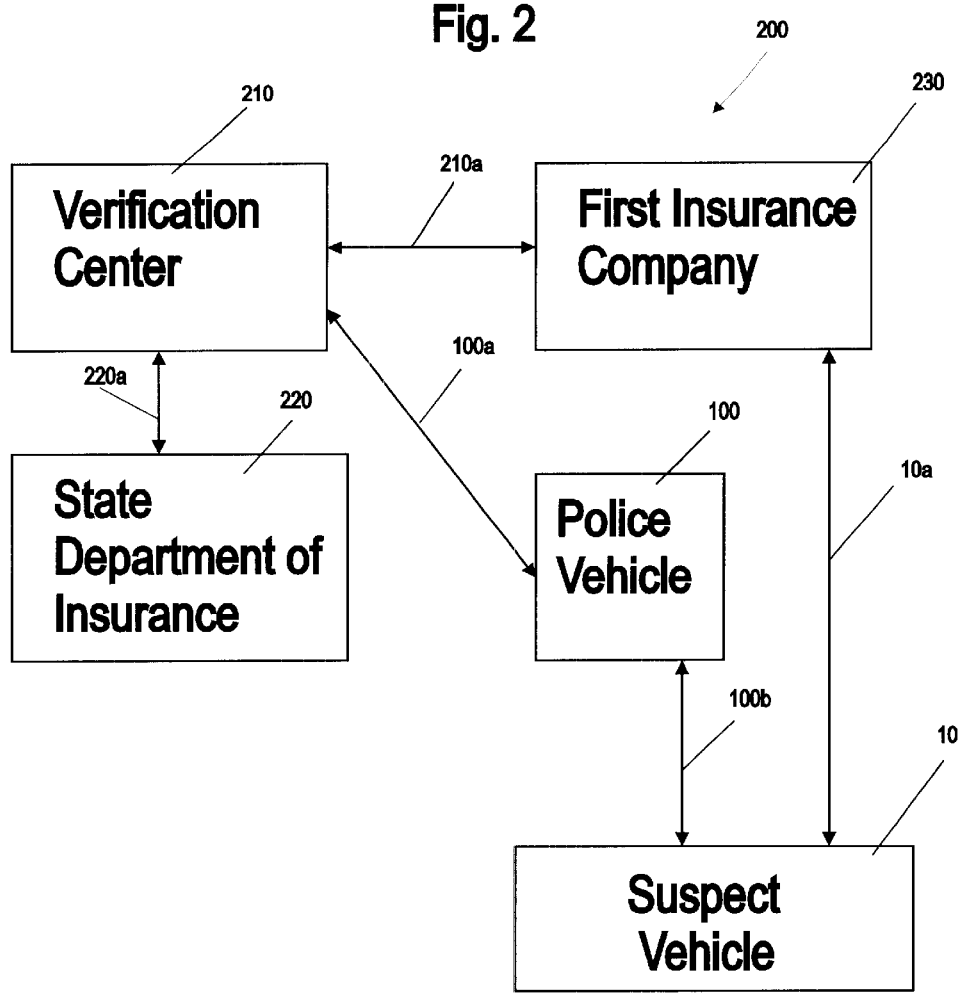
FIG. 2 shows a block diagram of portions of a method and apparatus detecting vehicles or drivers in violation of insurance laws or other motor vehicle laws.

FIG. 2 shows a block diagram 200 of portions of a method and apparatus detecting vehicles or drivers in violation of insurance laws or other motor vehicle laws. The block diagram 200 includes a verification center 210, the state department of insurance 220, a first insurance company 230, the police vehicle 100, and the suspect vehicle 10. The state department of insurance may communicate with the verification center 210 over a transmission channel 220a which may be a wireless transmission channel. The verificaiton center 210 may communicate with the first insurance company 230 over communication channel 210a which may also be a wireless communication channel. The police vehicle 100 may communicate with the verification center 210 and the suspect vehicle over channels 100a and 100b, respectively, which may also be wireless communication channels. The suspect vehicle 10 communicates with the first insurance company 230 over communication channel 10a which also may be a wireless communication channel.

Figure 3:
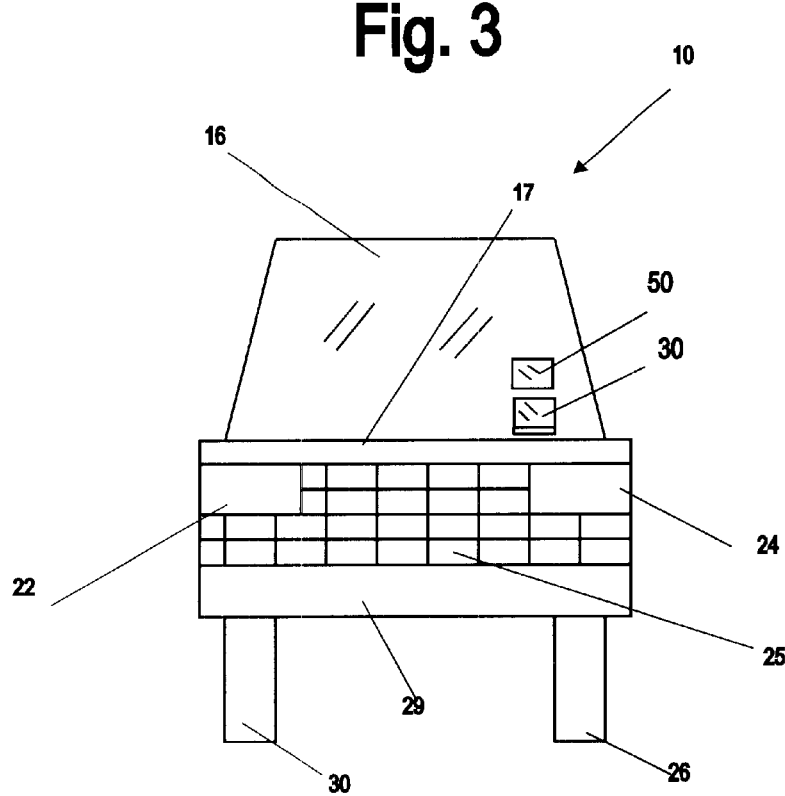
FIG. 3 shows a front planar view of the suspect vehicle of FIG. 1.

FIG. 3 shows a front planar view of the suspect vehicle 10 of FIG. 1. The suspect vehicle 10 has a front portion 17 which includes headlights 22 and 24, grill 25, front bumper 29, and front tires 30 and 26. In addition, a typical inspection sticker 50 is shown on the front windshield 16. The inspection sticker 50 may be inside the car and viewable through the transparent front windshield 16. The identification device 30 is shown attached to the front windshield in FIG. 3, just below the inspection sticker 50. The identification device 30 should be attached inside the suspect vehicle 10 so that it is insulated from bad weather and device 30 should be viewable through the front windshield 16.

Figure 4:
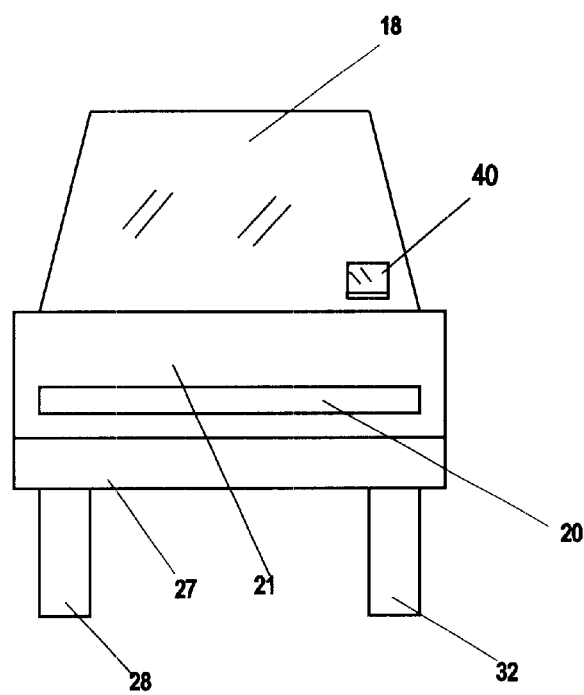
FIG. 4 shows a rear planar view of the suspect vehicle of FIG. 1.

FIG. 4 shows a rear planar view of the suspect vehicle 10 of FIG. 1. The suspect vehicle 10 has a rear portion 17 which includes a rear brake light 20, a rear bumper 27, and rear tires 28 and 32. The identification device 40 is shown attached to the rear windshield 18 in FIG. 4, in the right hand lower corner of the rear windshield 18. The identification device 40 should be attached inside the suspect vehicle 10 so that it is insulated from bad weather and device 40 should be viewable through the rear windshield 16 (which is transparent).

Figure 5:
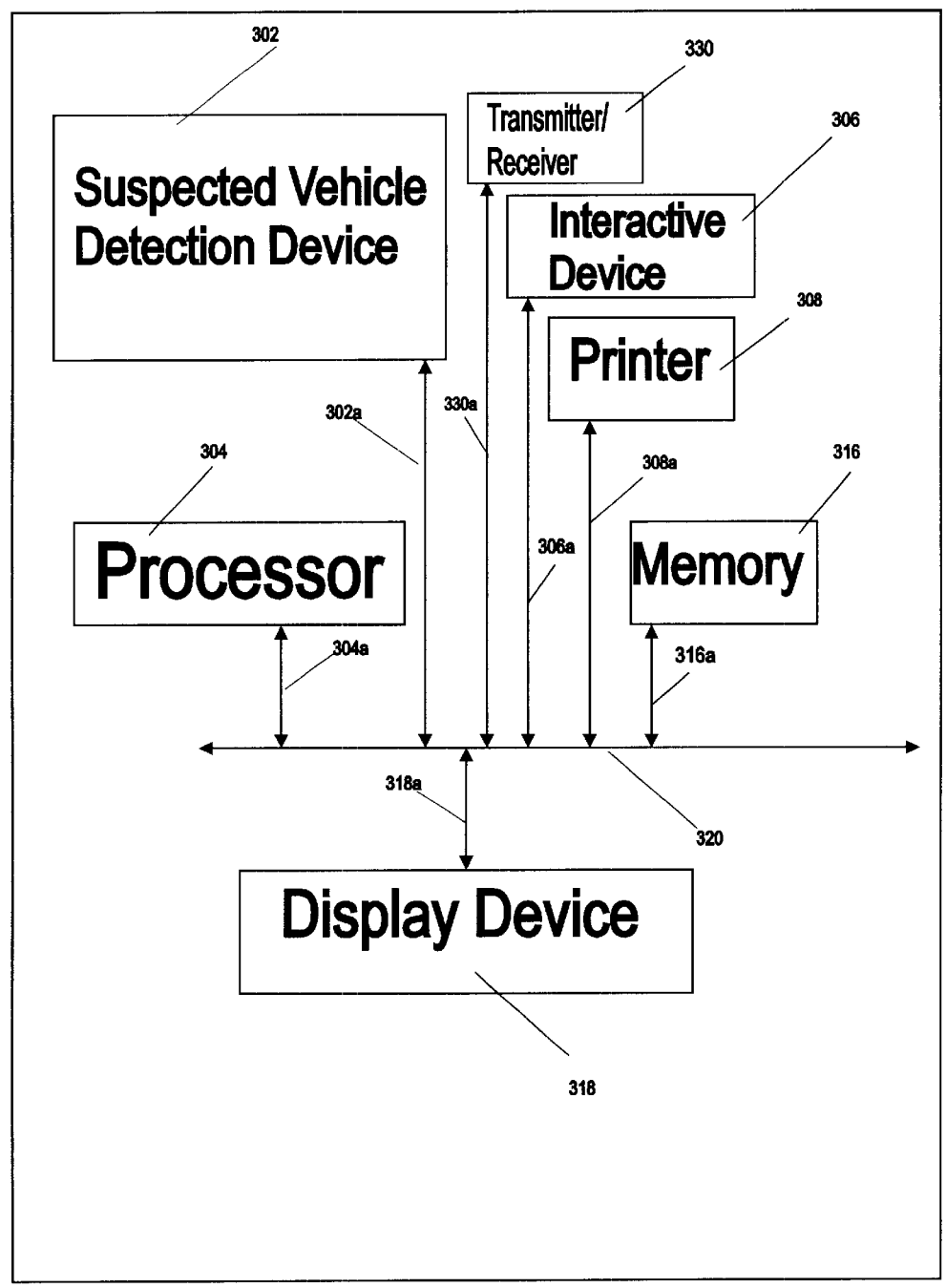
FIG. 5 shows a block diagram of components in the police vehicle for detecting whether the suspect vehicle and/or driver is in violation of insurance laws or other motor vehicle laws.

FIG. 5 shows a block diagram of the components in the housing 106 for detecting whether the suspect vehicle 10 and/or driver is in violation of insurance laws or other motor vehicle laws. Inside the housing 106 are located a suspect vehicle detection device 302, a processor 304, an interactive device 306, a printer 308, a memory 316, and a display device 318. The suspect vehicle detection device 302 is electrically connected to main bus 320 through bus 302a. The interactive device 306 is electrically connected to main bus 320 through bus 306a. The printer 308 is electrically connected to main bus 320 through bus 308a. The memory 316 is electrically connected to main bus 320 through bus 316a. The display device 318 is electrically connected to main bus 320 through bus 318a and the processor 304 is electrically connected to main bus 320 through the bus 304a.

The interactive device 306 may be a computer keyboard, a mouse, an interactive monitor, a voice recognition device, or any other known device for interacting or inputting information into a computer.

Figure 6A:
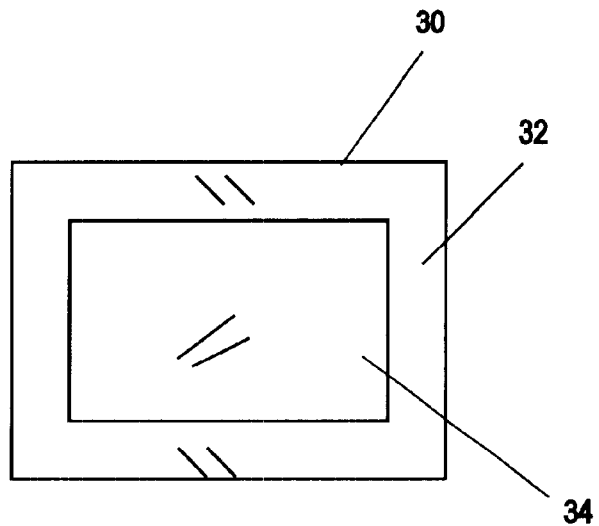
FIG. 6A shows an adhesive side of a first identification device which can be placed inside all motor vehicles such as the suspect vehicle in FIG. 1.
Figure 13A:
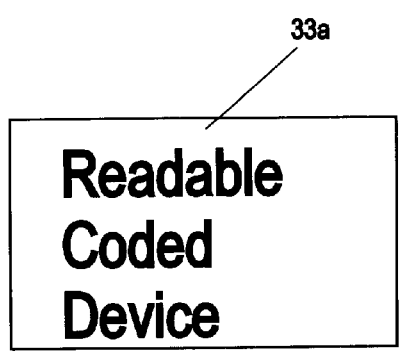
FIG. 13A shows a block diagram of a readable coded device.
Figure 13B:
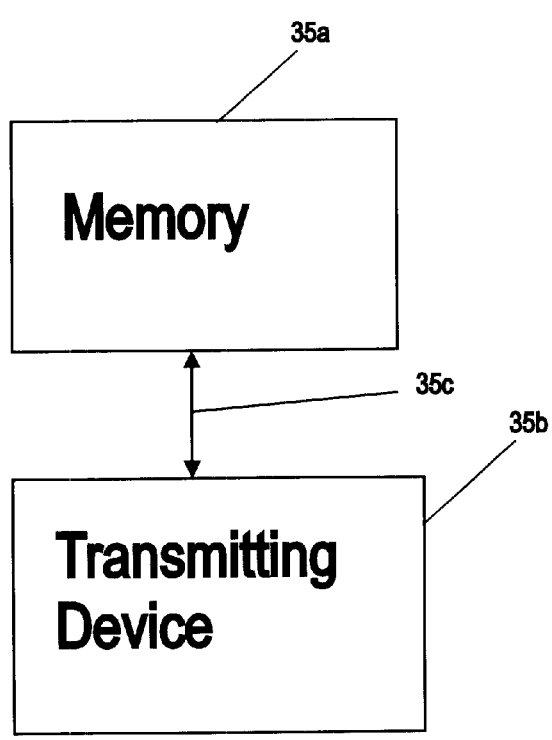
FIG. 13B shows a block diagram of a memory connected to a transmitting device.

FIG. 6A shows an adhesive side of the identification device 30 which can be placed inside all motor vehicles such as the suspect vehicle 10 in FIG. 1. The adhesive side may only actually include adhesive portion 32 located on towards the perimeter of the identification device 30. The housing portion 34 is also identified in FIG. 6A. The housing 34 may include a memory 35a, which may be RAM or ROM, electrically connected to a signal transmitter 35b by a bus 35c as shown in FIG. 13B. The signal transmitter 35b may transmit information stored in the electronic memory. The identification device housings 34 or 44 may alternatively not contain a transmitter and may contain a readable or scannable coded device 33a as shown in FIG. 13A which can be read or scanned, for example electromagnetically, by scanning, by light, or in any other known manner. For example the housings 34 or 44 may include a bar code which can be read by a bar code scanner. The housings 34 or 44 may be transparent if necessary.

Figure 6B:
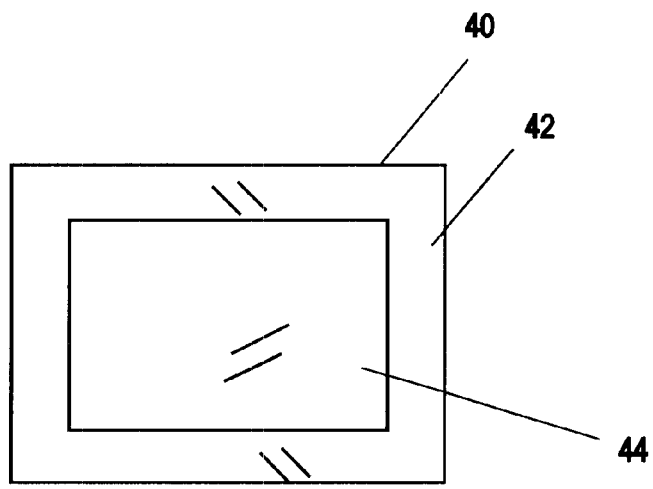
FIG. 6B shows an adhesive side of a second identification device which can be placed inside all motor vehicles such as the suspect vehicle in FIG. 1.

FIG. 6B shows an adhesive side of a second identification device 40 which can be placed inside all motor vehicles such as the suspect vehicle 10 in FIG. 1. Second identification device 40 may have an adhesive portion 42 and a housing 44, which may be the same as similarly named and numbers portions of the identification device 30.

FIG. 7 shows a table 400 which includes fields 402, 404, 406, 408, 410, 412, 414, 416, 418, 420, 422, and 424 in which are stored various information. The information in fields 402–424 may be stored on a visible card or in an electronic memory card, or in other forms. The first and second identification devices 30 and 40 may each include an electronic or computer memory such as RAM or ROM for storing information for fields 402–424. Field 402 contains the code of the underwriter insurance company which insures the suspect vehicle 10. Field 404 contains the policy number of the suspect vehicle 10. Field 406 includes the name of the underwriter insurance company which insures the suspect vehicle 10. Field 408 contains the issue date of the insurance policy for the suspect vehicle 10. Field 410 contains the vehicle manufacture serial code for the suspect vehicle 10. Field 412 contains the brand of vehicle and the year for the suspect vehicle 10. Fields 414, 416, 420, and 422, contain the expiration date of the insurance policy, the vehicle license plate number, the insurance policy number, and the vehicle owner name, respectively for the suspect vehicle 10.

FIG. 8 shows a table 500 of information which can be stored in the verification center 210 of FIG. 2. The verification center 210 may include computer or electronic memory such as RAM or ROM. The table 500 may include columns 502, 504, 506, 508, 510, 512, 514, and 516. Column 502 includes a list of underwriter codes for different underwriter insurance companies. Column 504 includes a list of names of insurance companies. Each name in column 504 corresponds to the underwriter insurance company code in column 502 in the same row. Column 506 contains a list of license plate numbers. Column 508 contains a list of vehicle manfucturers serial numbers. Column 510 contains a list of insurance policy numbers. Column 512 includes a list of issue dates for insurance policies. Column 514 includes a list of expiration dates for insurance policies and column 516 contains a list of brand names for the insured vehicles.

Each row in table 500 provides information relating to a single vehicle. For example, row 518 relates to a single vehicle. The vehicle corresponding to row 518 is a Mazda (shown in column 516) which has a license plate number Re1504 (column 506), has a vehicle manufacturing number of F52648911428 (column 508), and is insured by ABC insurance company (column 504) having an insurance company or underwriter code of 174 (column 502), the insurance policy having a policy number of F058996-0 (column 510), an issue date of April 2000 (column 512) and an expiration date of April 2001 (column 514).

FIG. 9 shows a table 600 of information regarding a particular underwriter of insurance which can be stored in the police vehicle 100. The table 600 may be stored in computer or electronic memory such as RAM or ROM, or CD ROM. The table 600 may include columns 602, 604, 606, 608, 610, and 612. Column 602 includes a list of underwriter codes for different underwriter insurance companies. Column 604 includes a list of insurance policy numbers. Column 606 contains a list of vehicle manfucturers' serial numbers. Column 608 includes a list of license plate numbers. Column 610 includes a list of issue dates for insurance policies. Column 612 includes a list of expiration dates for insurance policies.

Each row in table 600 provides information relating to a single vehicle. For example, row 616 relates to a single vehicle. The vehicle corresponding to row 616 has a vehicle manufacturing serial number of B0Z24442 (column 606), a license plate number of Re150 (column 608) and is insured by an insurance company having code number "174" (column 602), the insurance policy having a policy number of F05899 (column 604), an issue date of April 2000 (column 610) and an expiration date of April 2001 (column 612).

FIG. 10 shows a table 700 of information regarding revoked licenses which can be stored in electronic or computer memory, for example, in the police vehicle 100. The table 700 may include columns 702, 704, 706, 708, 710, 712, and 714. Column 702 includes a list of underwriter codes for different underwriter insurance companies. Column 704 includes a list of insurance policy numbers. Column 706 contains a list of vehicle manfucturers' serial numbers. Column 708 includes a list of license plate numbers. Column 710 includes a list of issue dates for insurance policies. Column 712 includes a list of expiration dates for insurance policies and column 714 contains a list of whether a license is revoked or suspended.

Each row in table 700 provides information relating to a single vehicle. For example, row 716 relates to a single vehicle. The vehicle corresponding to row 716 has a vehicle manufacturing serial number which is a combination of seventeen numbers or letters (column 706), a license plate number of "RR150B" (column 708) and is insured by an insurance company having code number "174" (column 702), the insurance policy having a policy number of F2564081 (column 704), an issue date of April 2000 (column 710) and an expiration date of April 2001 (column 712) and an indication of whether the primary driver of the vehicle currently has a revoked or suspended license.

In operation, an operator of the police vehicle 100 may use interactive device 306 of FIG. 5 to activate the suspect vehicle detection device 302. The suspect vehicle detection device may receive an identification signal which may be transmitted by one or both identification devices 30 and 40 which are located on the suspect vehicle 10. The identification signal may be comprised of one or more signals. The identification signal may include information of the type identified in FIG. 7 for table 400. The suspect vehicle detection device 302 may provide this identification signal in the same or in a modified form to the processor 304 through busses 302*a*, 320 and 304*a*. The processor 304 may examine the identification signal and determine the information of the type shown by table 400 from the identification signal. The processor may cause the table 400 type information to be displayed on the display device 318 of the police vehicle 100. The processor may also cause the table 400 type information for suspect vehicle 10 to be printed on printer 308 or to be stored in memory 316. In this manner the operator of the police vehicle 100 can determine if the suspect vehicle has insurance.

The identification devices 30 and 40 may not transmit a signal and may instead contain information which can be read by scanning or read in some other manner. In such as case the suspect vehicle detection device 302 of the police vehicle 100 may send out a signal to scan. For example, the suspect vehicle detection device 302 can be a bar code reader such as used in supermarkets, and the identification devices 30 and 40 may be bar code stickers.

In some cases, it may be better for the suspect vehicle detection device 302 to be in close proximity with the identification devices 30 and 40 in order to read the table 400 information from the identification devices 30 and 40. This can be accomplished by performing a scan, electromagnetic detection, or any other type of reading at a toll booth, when a car has slowed or has come to a stopped.

A police officer in police vehicle 100 may use interactive device 306 to cause the processor 304 to send a request verification signal out via transmitter/receiver 330. The request verificaiton signal may be comprised of table 400 information and a request as to whether the table 400 information received from suspect vehicle 10 has a corresponding entry in the verification center. The request verification signal may be received by verification center 210 via wireless channel 100*a* shown in FIG. 2. The verification center 210 may include a computer processor and computer memory. The computer memory of the verification center 210 may include information of the type shown in table 500 of FIG. 8. The processor of the verification center 210 may compare the table 400 information received from the police vehicle 100 with the table 500 information and may send back a yes verified signal to the police vehicle 100 if the table 400 information is listed in table 500. Otherwise the verification center 210 may send back a not verified signal to the police vehicle 100. The verification center 210 thus sends a verification signal to indicate whether the table 400 information is valid (i.e. verified or not verified).

Alternatively or additionally, the memory 316 of the police vehicle 100 may include the table 600 information. The table 400 information from the suspect vehicle 10 can be compared versus the table 600 information by the processor 304. The processor 304 may produce a positive signal on the display device 318 if the suspect vehicle 10 has its table 400 information listed in table 600. The memory 316 of the police vehicle 100 may also include the table 700 information regarding revoked licenses which also can be compared versus the table 400 information from the suspect vehicle 10 to determine if the suspect vehicle's primary driver has a revoked license.

The invention in one or more embodiments may include that each state insurance agency such as for example the Department of Insurance of the State of New Jersey may issue a unique identifying code number to every auto/motorcycle insurance underwriter in the state, such as the codes in column 502 in table 500. This unique code number can be numerical numbers e.g. (12345) or alphabetical e.g. (ABC) or a combination of numbers and alphabet or whatever the state department of insurance chooses to be the unique code number. This unique code number can always be used to identify a particular auto/motorcycle underwriter in the state.

Once every auto/motorcycle underwriter or insurance agency has been assigned a unique code number (such as codes shown in columns 502 of FIG. 8, column 602 of FIG. 9, column 702 of FIG. 10, and in field 402 of FIG. 7), then they may be advised to modify or redesign the way they produce and issue insurance premium receipts to prospective customers. The newly redesigned auto/motorcycle receipt should be in five copies as follows:

(1) Customer/driver hard copy (may have no code number)

(2) Hard copy goes to verification center (3) File copy for insurance company underwriter (4 & 5) The remaining copies should be designed in the form of the identfication devices 30 and 40 previously described which may be labels about 3"×6" with sticker edges and with a microchip memory including information of the insured vehicle shown in FIG. 7.

The identification devices 30 and 40 may be given to the insured vehicle owner once they purchase auto/motorcycle insurance from any auto/motorcycle underwriter. The insured vehicle owner may get a total of three auto insurance receipts. One pocket size receipt and two small size (3"×6") with microchip information which corresponds to identification devices 30 and 40.

The verification center 210 may be a storage center where information concerning all the motorcycles and automobiles registered and insured in New Jersey are stored for reference or verification purposes by street patrol police vehicles. The verification center 210 may include computer memory and/or human personnel who may confirm via telephone to the street patrol police officer whether the insurance papers presented by a suspected traffic offender (such as vehicle 10 are valid or not and whether the vehicle (such as vehicle 10) in question is insured or not. Every auto/motorcycle underwriter doing business in a state, should have the name of all their insured vehicles' status and other relevant vehicle information stored at the verification center 210 and every auto/motorcycle underwriter in the state should update the verification center 210 for all newly insured vehicles, the drivers who have failed to renew their insurance, etc. Also, the verification center 210 should check daily with those insurance underwriters for new insured vehicles. This may be done by computers and/or human personnel.

Information can be built into the computer system of systems which are part of the verification center 210 as well as in the memory 316 of the police motor vehicle. The police officer on street patrol can always verify if a driver/motorist has insurance via telephone or by typing a verification request on the interactive device 306 and the verification request may go out on transmitter/receiver 330 to the verification center 210. Information may also be stored in memory 316 in the police vehicle 106 which may include a portable CD (compact disc) that may include up to 500,000 insured vehicles' information or as the law may allow. Compact discs and other memory devices generally can be used as memory 316 in the police vehicle 100.

A second set of information at the verification center 210 could be stored as a single roll of big industrial film (the movie type tape recorder) or in any other known manner that may be able to contain all the names of underwriters of auto/motorcycle insurance, their code number and all the relevant identification information as in what table 600. However, if one single industrial tape does not contain all the auto/motorcycle underwriter information in the state then this information may be contained in two or more tapes. If it is 1, 2 or more tapes they all can be rolling, revolving, scanning, and or censoring simultaneously.

The housing 106 for the components in police motor vehicle 100 can be connected to the roof of the police vehicle 100 as shown in FIG. 1 underneath siren 104 towards approaching vehicles (FIG. 5) or side by side with the emergency siren 104 pointing towards approaching vehicles.

The suspect vehicle detection device 302, if a scanner, may be able to scan up to twenty or more vehicles' auto insurance microchip window stickers, such as identification devices 30 or 40 at a time as long as the scanners in the police vehicle 100 can reach/scan the vehicle 10. If the vehicles are moving at too fast a rate for the system to scan and process, then it may be able to scan the suspect vehicle 100 and store the vehicle auto insurance information in memory 316 of the police vehicle 100. However, if a suspect vehicle has out of state auto insurance window and/or out of state registration it will still be scanned but might not be able to be processed. The police office may have to call the state verification center 210 to find out about the auto insurance status of the particular vehicle which is out of state.

The suspect vehicle detection device 302 can be designed so that it will be adjustable. For example, when traffic is slow/low in one lane it can scan multi lanes. However, if traffic is heavy it will scan one lane to prevent over burdening the whole system.

The code number of the underwriter, such as in columns 502, 602, and 702, and field 402 and the policy number of the insured vehicle (such as in field 404, columns 510, 604, and 704 should be in bold, capital letters on the hard copy receipt of the information in FIG. 7. The identification devices 30 and 40 with the information in the table 400 in FIG. 7 should be easily scanned by the scanner/sensor in the police vehicle 100. Once the scanner in the police patrol car scans the underwriter code number (field 402) and the vehicle auto insurance policy number (field 404), then a processor 304 in the police vehicle 100 may immediately reproduce from its memory 316 matching underwriter code number in table 600. In other words, the underwriter code number scanned (field 402) should be the same code number that will be pulled up in the police vehicle 100 by the processor 304. If the scanned information from the identification device 30 or 40 (information in table 400 in FIG. 7) matches the information in the police vehicle table 600 for a specific policy number then a silent beeping green light may be produced by the processor 304 on the display device 318. However, if the vehicle policy number in the scanner memory does not match any of the policy numbers in the table 600 in FIG. 9 an extended red beeping sound may be produced by the processor 304 on the display device 318. This sound may be displayed on the display device 318 until the officer uses the interactive device 306 to change what appears on the display device 318.

If there is no identification device (such as 30 or 40) on a suspect vehicle for the suspected vehicle detection device 302 in the police vehicle 100 to detect the processor 304 will cause a message to display on the display device 318 that there is no identification device (such as 30 or 40) on a suspect vehicle. If there is any conflict at all between the identification device 30 (or 40) and the memory 316 in the police vehicle 100 it may report it on the display device 318 with an extended beeping red light warning that there is something that needs to be investigated by the officer in the police vehicle 100. The processor 304 may then display this information on the display device 318.

If tapes are used for the memory 316 in the police vehicle 100, the tapes can also be fast forwarded or rewinded.

There should be only one code number for every underwriter or insurance agency. In the case of franchises, typically only one code number will be assigned to the whole franchise. Alternatively, for a franchise A, the codes A1, A2, A3, etc., may be used, for example, to show different locations for the franchise.

The present invention in at least one embodiment can be used to track stolen vehicles. The owner of the stolen vehicle may report to the auto insurance company that the vehicle was stolen. The auto insurance company (such as company 230 in FIG. 2) in turn may report the stolen vehicle to the verification center 210 via communication channel 210a which may be a wireless communication channel. The company 230 may include a computer which may communicate with a computer at the verification center 210. The verification center 210 in turn may notify law enforcement, such as the police vehicle 100 via communication channel 100a.

If a thief tampers with the identification devices 30 and 40 on the suspect vehicle 10, the thief will be pulled over as driving an uninsured vehicle and then the police officer may either find out the suspect vehicle 10 has been stolen by having the processor 304 examine the memory 316 or by the police officer calling the verification center 210. The stolen vehicle indication may be displayed on the display device 318 by the processor 304.

The present invention in at least one embodiment allows a police officer operating police vehicle 100 to detect the information from an identification device such as 30 or 40 and then to later on compare that information versus data in memory 316 or at the verification center 210. The police vehicle 100 does not have to pull over the suspect vehicle 10 but rather can later on issue a citation or visit the residence of the violator and tow away a suspect vehicle or demobilize it. The components such as the suspect vehicle detection device 302 in the housing 106 may be installed in sport utility vehicle or the components in the housing 106 shown in FIG. 5 may be located at a toll booth or a stop signal, and not actually located in a vehicle.

An insurance verification directory handbook for drivers with out of state insurance cards and license plate numbers may also be provided. The hand book may list the telephone numbers, fax, email, addresses of every auto/ motorcycle underwriter in every state it also may provide the definition of the abbreviated names and their code numbers, and the name(s) and street addresses. Hopefully, it will also contain the location of each state's verification center (similar to center 210) and phone, fax, or e-mail information for contacting the particular verification center. This information may also be contained in memory 316 or at each state's verification center 210. If a police officer in New Jersey for example, runs into a problem with a vehicle that has insurance from Texas, the officer may call the Texas verification center for the information needed. It should have references of multiple license plates for out of state police officers trying to verify the insurance status of a vehicle from out of state.

This invention in at least one embodiment can assist in tracking motorists driving with suspended operator license. Once an operator license is suspended or revoked the portion of their insurance policy may be marked "revoked or suspended" and this information can be provided in identification devices 30 or 40, in memory 316 in the police vehicle 100, or in the verification center 210. If the police officer operating police vehicle 100 detects an identification device (like 30 or 40) of a suspect vehicle whose primary driver has a revoked license, the police officer may pull over the suspect vehicle. A rental Car Company should be advised to verify the driving records of the prospective client before renting out their cars by checking with the verification center 210 (in the particular state where they are operating or nationally).

Figure 11:
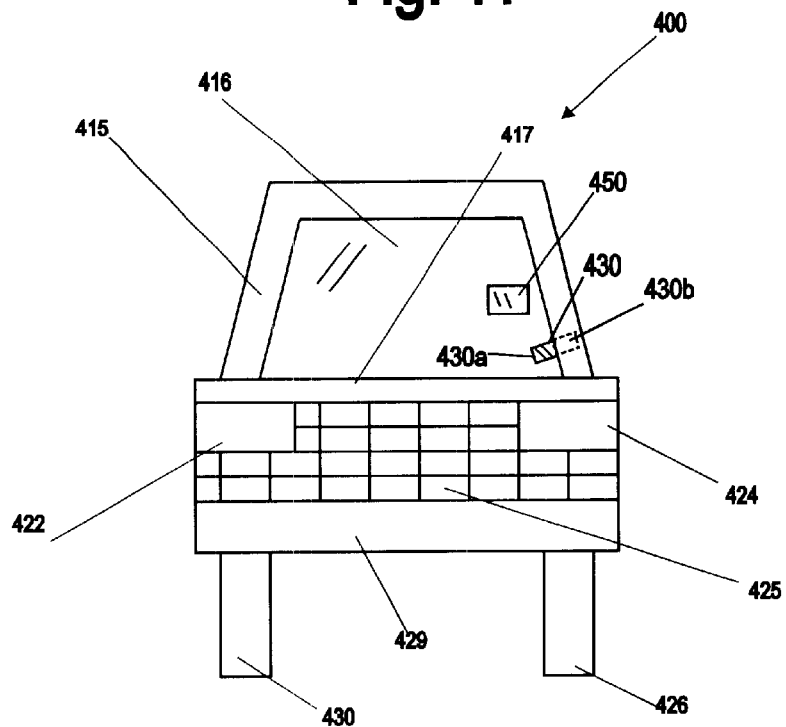
FIG. 11 shows a front planar view of another suspect vehicle in accordance with another embodiment of the present invention.

FIG. 11 shows a front planar view of a suspect vehicle 400 in accordance with another embodiment of the present invention. The suspect vehicle 400 includes a frame 415, a front windshield 416, a front 417, an inspection sticker 450, an identification device 430, front headlights 422 and 424, grill 425, bumper 429, tires 426 and 430. The identification device 430 may be of the same type as the identification device 30 of FIG. 3 except that the identification device 430 may include a retraction device which causes identification device 430 to lie outside the windshield 416 when the vehicle is operating and to retract into the frame 415 when the vehicle 400 is not operating. The identification device 430 can be placed in position 430a, which is outside the windshield 416, when a person is driving a car, so that identification device 430 can be scanned or so that it's signal can be easily received without being interfered with. When the vehicle 400 is in park, the identification device 430 can retract itself into position 430b which is inside the door frame. The position 430b is to prevent theft of the identification device 430 or excessive damage by weather. The identification device 430 may come out automatically into position 430a when the vehicle 400 is started and may retract automatically into frame 415 when the car is shut off.

Figure 12:
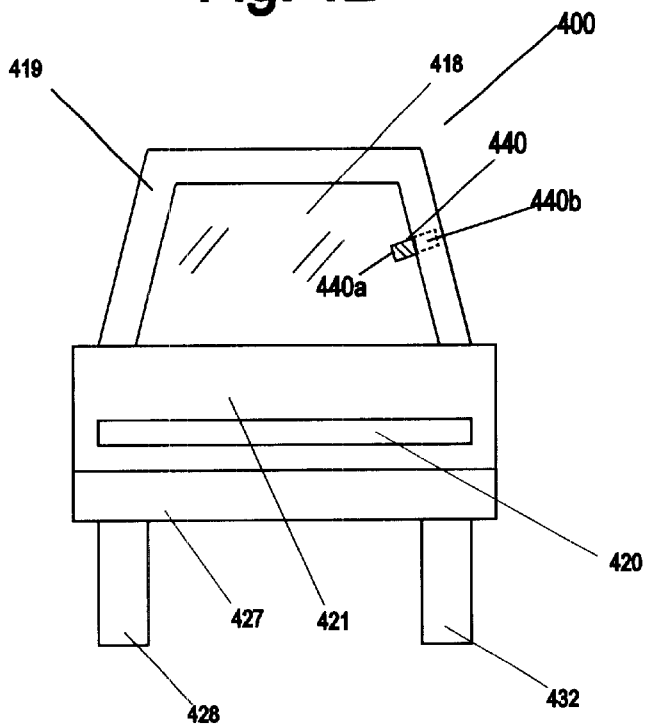
FIG. 12 shows a rear planar view of another suspect vehicle in accordance with another embodiment of the present invention.

FIG. 12 shows a rear planar view of the suspect vehicle 400 which includes the identification device 440, rear portion 421, rear light 420, rear bumper 427, and rear tires 428 and 432. The identification device 440 may be the same as identification device 40 except that it may lie outside of the rear windshield 418 when the car is operating and may retract into the frame 419 when the car is not operating. The identification device 440 may come out into position 440a when the car is started and may retract into position 440b when the vehicle 400 is shut off.

The identification devices 430 or 440 can be located higher up on the windshields 416 and 418. The identification devices 430 or 440 should be located to avoid contact with wiper blades. The identification devices 430 and 440 can be located at a position in between the frame on the end of the front windshield 16 of the suspect device 400 and the front passenger door area 427. The identification devices 430 and 440 can be laminated and scannable as well, to sustain any harsh weather condition to avoid danger. The devices 430 and 44 may also be below or above the trunk area. The identification devices 430 and 440 may appear in positions 430*a* and 440*a*, respectively, once the ignition key is on and the engine is running and can return to positions 430*b* and 440*b* once the car is shut off or the ignition key is turned off.

I claim:

1. An apparatus comprising an identification device;

wherein the identification includes electronic memory which contains insurance information about a motor vehicle;

wherein the identification device can be attached to the motor vehicle; and wherein the insurance information in the identification device can be detected by a detection device; and wherein the identification device automatically moves to a position outside the motor vehicle when the motor vehicle is started, and automatically retracts to a position inside the motor vehicle when the motor vehicle is shut off.

* * * * *